US007940772B2

(12) United States Patent
Liu et al.

(10) Patent No.: US 7,940,772 B2
(45) Date of Patent: May 10, 2011

(54) METHODS, SYSTEMS, AND COMPUTER PROGRAM PRODUCTS FOR TRANSPORTING ATM CELLS IN A DEVICE HAVING AN ETHERNET SWITCHING FABRIC

(75) Inventors: Jinshui Liu, Plano, TX (US); Weisheng Chen, Allen, TX (US); Eric Chien-Chung Chang, Plano, TX (US); Yen Shei, Plano, TX (US); David Z. Lu, Dallas, TX (US)

(73) Assignee: Genband US LLC, Plano, TX (US)

( * ) Notice: Subject to any disclaimer, the term of this patent is extended or adjusted under 35 U.S.C. 154(b) by 886 days.

(21) Appl. No.: 11/138,990

(22) Filed: May 26, 2005

(65) Prior Publication Data

US 2006/0268888 A1  Nov. 30, 2006

(51) Int. Cl.
*H04L 12/28* (2006.01)
(52) U.S. Cl. .................................................... 370/395.1
(58) Field of Classification Search .................. 370/356, 370/466, 395.1, 395.3
See application file for complete search history.

(56) References Cited

U.S. PATENT DOCUMENTS

| | | | |
|---|---|---|---|
| 5,818,842 A | 10/1998 | Burwell et al. | |
| 6,061,348 A | 5/2000 | Castrigno et al. | |
| 6,111,880 A | 8/2000 | Rusu et al. | |
| 6,154,445 A * | 11/2000 | Farris et al. | 370/237 |
| 6,633,563 B1 * | 10/2003 | Lin et al. | |
| 6,714,535 B1 * | 3/2004 | Herh | |
| 6,741,585 B1 | 5/2004 | Munoz et al. | |
| 6,754,745 B1 * | 6/2004 | Horvath et al. | |
| 6,766,482 B1 | 7/2004 | Yip et al. | |
| 6,771,673 B1 * | 8/2004 | Baum et al. | |
| 6,850,531 B1 | 2/2005 | Rao et al. | |
| 6,862,564 B1 | 3/2005 | Shue et al. | |
| 6,879,667 B1 * | 4/2005 | Carew et al. | 379/88.17 |
| 6,891,836 B1 | 5/2005 | Chen et al. | |
| 6,975,587 B1 | 12/2005 | Adamski et al. | |
| 7,177,943 B1 * | 2/2007 | Temoshenko et al. | |

(Continued)

FOREIGN PATENT DOCUMENTS

| WO | WO 2005/033889 A2 | 4/2005 |
|---|---|---|
| WO | WO 2005/034449 A1 | 4/2005 |
| WO | WO 2005/034454 A2 | 4/2005 |
| WO | WO 2006/128005 A2 | 11/2006 |

OTHER PUBLICATIONS

Notification of Transmittal of the International Search Report and the Written Opinion of the International Searching Authority, or the Declaration for International Application No. PCT/US06/20253 (Aug. 22, 2007).

(Continued)

*Primary Examiner* — Derrick W Ferris
*Assistant Examiner* — Peter Cheng
(74) *Attorney, Agent, or Firm* — Jenkins, Wilson, Taylor & Hunt, P.A.

(57) ABSTRACT

The subject matter described herein includes methods, systems, and computer program products for transporting ATM cells in a device having an Ethernet switching fabric. According to one method, at least one ingress ATM cell is received at an ATM network interface of a device having an Ethernet switching fabric. Next, the connection associated with which the ingress ATM cell is identified. The ATM cell is encapsulated in Ethernet frame addressed to a media processing resource associated with the connection. The Ethernet frame is forwarded to the media processing resource across an Ethernet switching fabric.

44 Claims, 7 Drawing Sheets

U.S. PATENT DOCUMENTS

| | | | |
|---|---|---|---|
| 7,185,094 B2 * | 2/2007 | Marquette et al. | |
| 7,212,519 B2 * | 5/2007 | Johnson et al. | |
| 7,233,567 B1 | 6/2007 | Li | |
| 7,239,605 B2 | 7/2007 | Dinker et al. | |
| 7,269,658 B2 * | 9/2007 | Tao | 709/229 |
| 7,424,025 B2 * | 9/2008 | Qian et al. | |
| 7,681,069 B1 | 3/2010 | Chellappa et al. | |
| 2001/0009550 A1 * | 7/2001 | Mizuhara | 370/393 |
| 2002/0012352 A1 * | 1/2002 | Hansson et al. | |
| 2002/0016926 A1 * | 2/2002 | Nguyen et al. | |
| 2002/0051464 A1 * | 5/2002 | Sin et al. | |
| 2002/0174251 A1 * | 11/2002 | Lasserre | 709/249 |
| 2002/0191612 A1 * | 12/2002 | Curtis | |
| 2003/0118039 A1 * | 6/2003 | Nishi et al. | |
| 2003/0142795 A1 * | 7/2003 | Gavette et al. | |
| 2003/0174729 A1 * | 9/2003 | Heink et al. | 370/466 |
| 2004/0066782 A1 * | 4/2004 | Nassar | |
| 2004/0131064 A1 | 7/2004 | Burwell et al. | |
| 2005/0053073 A1 * | 3/2005 | Kloth et al. | |
| 2005/0074017 A1 * | 4/2005 | Qian et al. | |
| 2005/0165885 A1 * | 7/2005 | Wong | 709/201 |
| 2005/0185577 A1 * | 8/2005 | Sakamoto et al. | |
| 2005/0243716 A1 * | 11/2005 | Bitar et al. | |
| 2006/0023736 A1 * | 2/2006 | Boll et al. | 370/458 |
| 2006/0268686 A1 | 11/2006 | Shei et al. | |
| 2007/0083528 A1 * | 4/2007 | Matthews et al. | |
| 2009/0092044 A1 * | 4/2009 | Saito | |

OTHER PUBLICATIONS

Commonly-assigned, co-pending U.S. Patent Application Serial No. To be Assigned for "Methods, Systems, and Computer Program Products for Implementing Automatic Protection Switching for ATM Cells Transmitted Over an Ethernet Switching Fabric," (Unpublished, filed May 26, 2005).

Martini, et al. "Encapsulation Methods for Transport of ATM Over MPSL Networks," Network Working Group, Internet Draft, (Apr. 2005).

Stern, et al. "Survivability: Protection and Restoration," Multiwavelength Optical Networks, p. 610-613, (May 1999).

Official Action for U.S. Appl. No. 11/139,019 (Sep. 17, 2008).

Notification of Transmittal of the International Search Report and the Written Opinion of the International Searching Authority, or the Declaration for International Application No. PCT/US06/20456 (Oct. 20, 2006).

Final Official Action for U.S. Appl. No. 11/139,019 (Mar. 23, 2009).

Interview Summary for U.S. Appl. No. 11/139,019 (Jan. 27, 2009).

Non-Final Official Action for U.S. Appl. No. 11/139,019 (Oct. 28, 2009).

Communication pursuant to Rules 161 and 162 EPC for European Patent Application No. 04789383.9 (Sep. 24, 2008).

Notice of Allowance and Fee(s) due for U.S. Appl. No. 10/676,233 (May 2, 2008).

Official Action for U.S. Appl. No. 10/676,233 (Nov. 28, 2007).

Official Action for U.S. Appl. No. 10/676,233 (Jun. 11, 2007).

Communication pursuant to Rules 109 and 110 EPC for European Application No. 04789383.9 (Aug. 22, 2006).

International Search Report and Written Opinion for International Application No. PCT/US04/31920 (Mar. 4, 2005).

International Search Report and Written Opinion for International Application No. PCT/US04/31918 (Feb. 11, 2005).

Yoo et al., "A Media Stream Processing of vol. P Media Gateway," IEEE, pp. 91-94 (2003).

Official Action for U.S. Appl. No. 11/139,019 (Jan. 4, 2011).

* cited by examiner

US 7,940,772 B2

METHODS, SYSTEMS, AND COMPUTER PROGRAM PRODUCTS FOR TRANSPORTING ATM CELLS IN A DEVICE HAVING AN ETHERNET SWITCHING FABRIC

TECHNICAL FIELD

The subject matter described herein relates to transporting ATM cells over an Ethernet switching fabric. More particularly, the subject matter described herein relates to methods, systems, and computer program products for transporting ATM cells in a device having an Ethernet switching fabric.

BACKGROUND ART

In conventional media processing devices, such as media gateways, I/O ports and internal processing resources are connected to each other via a switching fabric, also referred to as a switching matrix. One conventional type of switching fabric is an ATM switching fabric. ATM switching fabrics transport ATM cells between internal processing resources and I/O ports.

In modern telecommunications networks, media gateways are used to connect telephony calls (also known as sessions) between various types of communications terminals. These communications terminals may be packet-based communications terminals or traditional TDM communications terminals. Media gateways perform media format translation functions so that the media streams delivered to the various types of communications terminals are in the proper formats.

FIG. 1 is a block diagram illustrating a conventional media gateway including an ATM switching fabric. The block diagram illustrated in FIG. 1 corresponds to a media gateway formerly available from the assignee of the present invention as the SANTERAONE media gateway. Referring to FIG. 1, media gateway 100 includes an ATM switching fabric 102 and a TDM matrix 104. ATM switching fabric 102 switches ATM cells between ATM network interfaces 106 and voice servers 108. ATM switching fabric 102 also switches IP packets between IP network interfaces 110 and voice servers 108. TDM matrix 104 switches voice channels between TDM network interfaces 112 and voice servers 108.

Currently, Ethernet switching equipment is less expensive than ATM switching equipment. In addition, the switching bandwidth or capacity of Ethernet switching equipment is increasing at a faster rate than that of ATM switching equipment. As a result, it may be desirable to replace ATM switching equipment with Ethernet switching equipment. However, in architectures that include ATM interfaces, a mechanism has not been provided for transporting ATM cells to and from the ATM interfaces over an Ethernet switching fabric.

Accordingly, there exists a need for improved methods, systems, and computer program products for transporting ATM cells in a device including an Ethernet switching fabric.

SUMMARY

According to one aspect, the subject matter described herein includes a method for transporting ATM cells in a device having an Ethernet switching fabric. The method includes receiving at least one ingress ATM cell at an ATM network interface of a device having an Ethernet switching fabric. A connection associated with the ATM cell is identified. The at least one ATM cell is encapsulated in an Ethernet frame addressed to the media processing resource associated with the connection. The Ethernet frame is forwarded to the media processing resource associated with the connection via the Ethernet switching fabric.

The subject matter described herein may be implemented using a computer program product comprising computer executable instructions embodied in a computer readable medium. Exemplary computer readable media suitable for implementing the subject matter described herein include chip memory devices, disk memory devices, application specific integrated circuits, and programmable logic devices. Moreover, it is understood that a computer readable medium that implements that subject matter described herein may be distributed across multiple devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
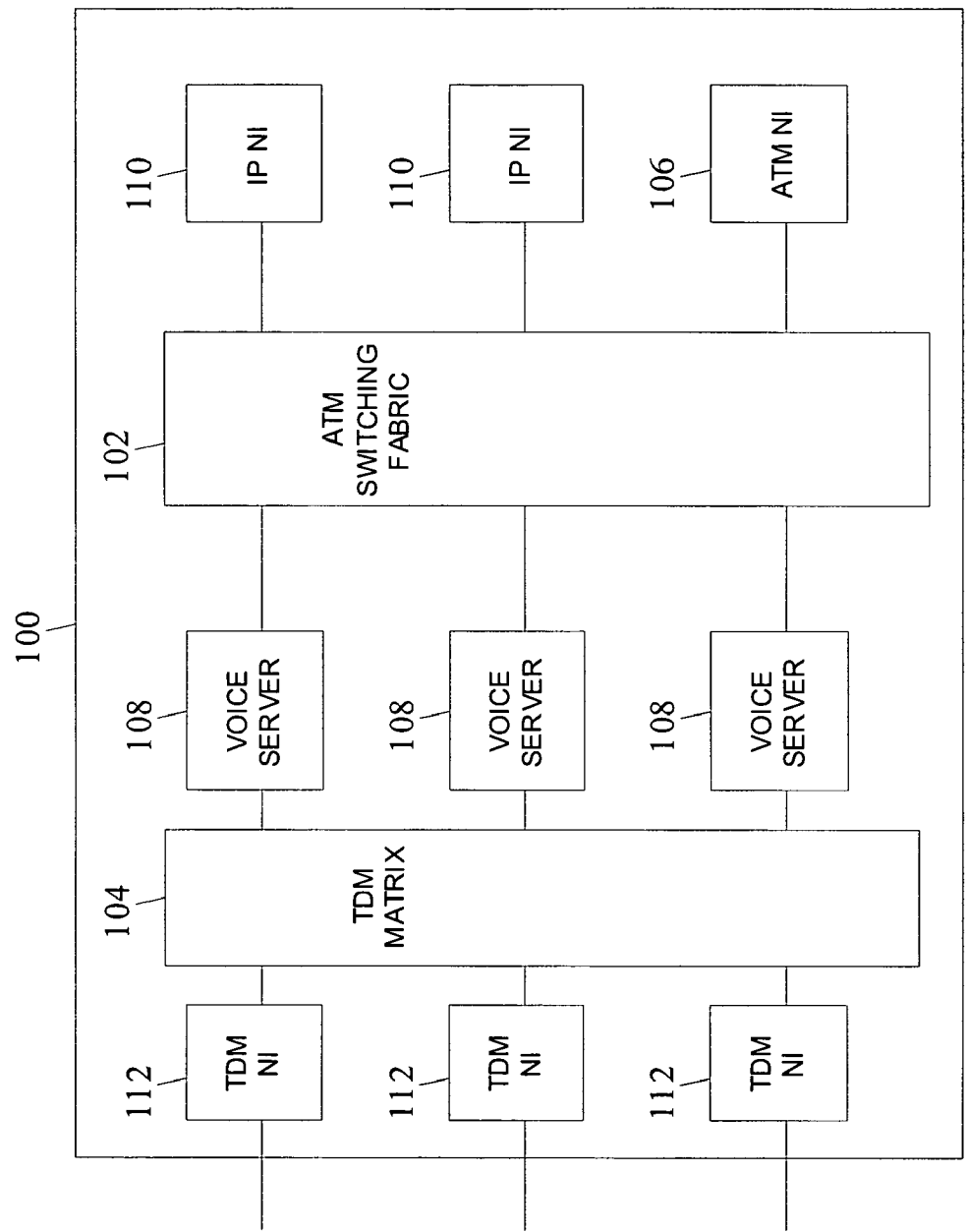
FIG. 1 is a block diagram illustrating a conventional media gateway architecture including an ATM switching fabric.
Figure 2:
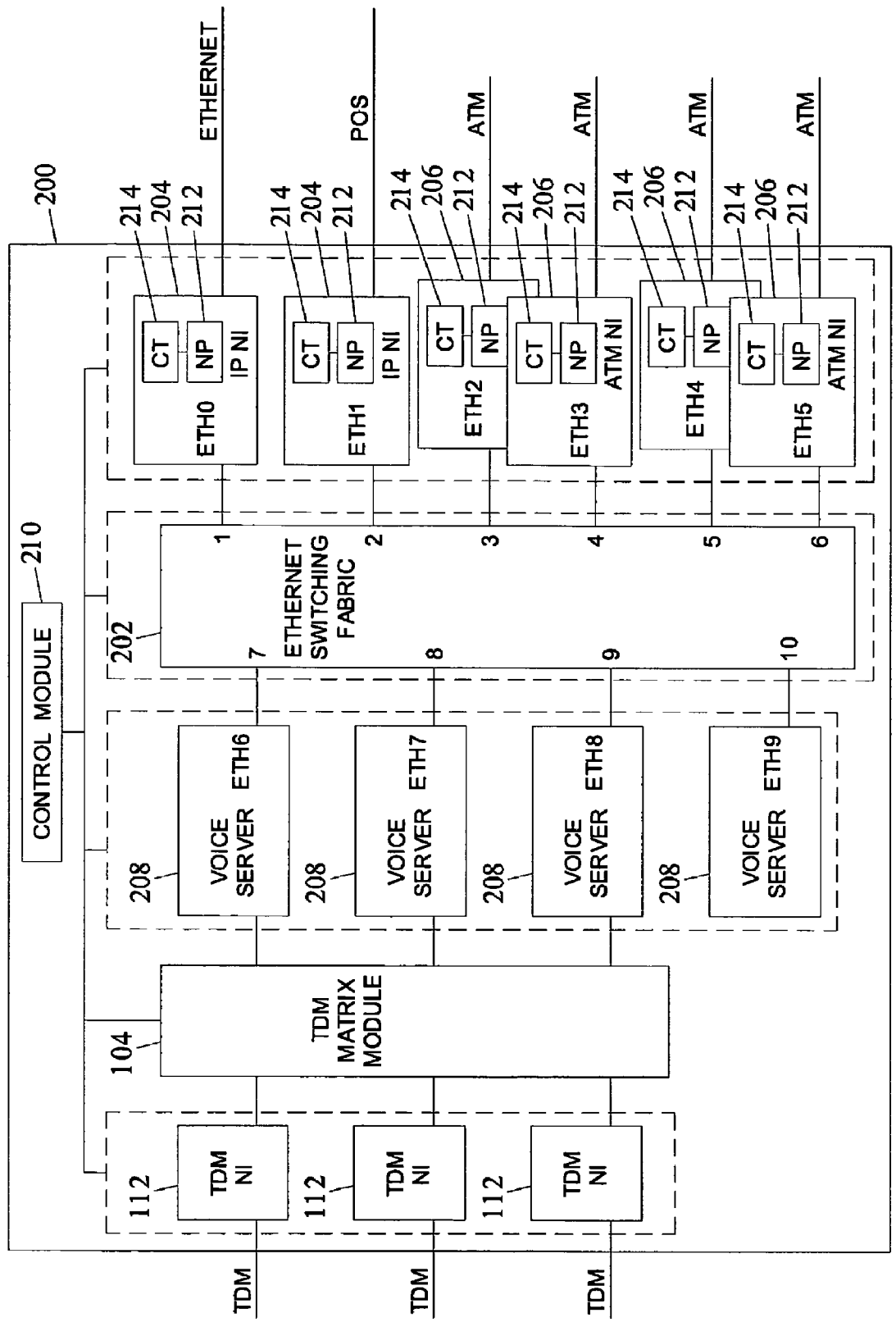
FIG. 2 is a block diagram illustrating a media gateway having ATM network interfaces and an Ethernet switching fabric according to an embodiment of the subject matter described herein.

According to one aspect, the subject matter described herein includes a media gateway having an Ethernet switching fabric, at least one ATM network interface, and that switches ATM cells to and from the network interfaces via the Ethernet switching fabric. FIG. 2 illustrates an exemplary media gateway that includes these features. Referring to FIG. 2, media gateway 200 includes Ethernet switching fabric 202 that switches traffic between IP network interfaces 204, ATM network interfaces 206, and voice servers 208. Voice servers 208 perform media processing functions for communications between end users. For ATM cells that carry voice information, voice servers 208 may perform segmentation and reassembly operations. Voice servers 208 may also perform transcoding operations for voice calls. Voice servers 208 may process other media types, such as video and data. Accordingly, voice servers 208 may generically be referred to as media processing resources. A control module 210 controls the overall operation of media gateway 200.

Media gateways are controlled by network entities referred to as media gateway controllers (MGC), commonly referred to as soft switches. Soft switches perform call signaling functions to establish sessions between communications terminals via one or more media gateways. Soft switches communicate with media gateways via one or more gateway control protocols, such as MEGACO or MGCP.

Ethernet switching fabric 202 may be any suitable Ethernet switch capable of switching traffic between ports. In one exemplary implementation, Ethernet switching fabric 202 may be implemented using a gigabit Ethernet switching fabric, such as those manufactured by Broadcom Corporation or Marvel Technology Group Limited. The specific model used may be selected based on the number of ports required by media gateway 200. For purposes of illustration, Ethernet switching fabric 202 is shown as having ten ports numbered 1-10. It is understood that Ethernet switching fabric 202 would have more than ten ports. However, ten ports are shown in FIG. 2 because ten different devices are connected to the ports.

IP network interfaces 204 each include functionality for sending and receiving media packets, such as voice packets, over an IP network. In order to interface with Ethernet switching fabric 202, each IP network interface 204, ATM network interface 206, and voice server 208 may include an Ethernet transceiver that connects to the corresponding port of switching fabric 202.

ATM network interfaces 206 receive ATM cells from the network, forward the ATM cells to an assigned voice server 208 via Ethernet switching fabric 202, receive ATM cells from voice servers 208 via Ethernet switching fabric 202, and forward the ATM cells over the network. In the illustrated example, each ATM network interface 206 includes a network processor 212 and a connection table 214. Network processors 212 perform VPI/VCI translations, encapsulate ingress ATM cells in Ethernet frames, receive Ethernet frames from Ethernet switching fabric 202, and extract egress ATM cells from the Ethernet frames. Connection tables 214 store connection data used by network processors 212 to identify a connection with which each ATM cell is associated and to forward the ATM cell to the voice server associated with the connection. IP network interfaces 204 may also include network processors 212 and connection tables 214 for forwarding incoming IP packets to the appropriate voice server 208.

As stated above, each connection table 214 may store a voice server associated with each connection. In ATM networks, connections are typically identified by VPI/VCI values in ATM cells. Accordingly, for ATM cells, each entry in connection table 214 may associate VPI/VCI values with a voice server assigned to each connection. Since media gateway 200 includes an Ethernet switching fabric, each connection may be identified by a voice server MAC address. In the illustrated example, four voice servers 208 are shown, each having its own Ethernet address.

Voice servers 208 may be dynamically assigned to new connections based on relative voice server utilization, as described in commonly-assigned, co-pending U.S. patent application Ser. No. 10/676,233, filed Oct. 1, 2003, the disclosure of which is incorporated herein by reference in its entirety. Tables 1A and 1B shown below illustrate exemplary connection data that may be dynamically populated based on relative voice server utilization. The data in Table 1A may be stored in the connection table of one of the network interfaces illustrated in FIG. 2, and the data in Table 1B may be stored by another of the ATM network interfaces illustrated in FIG. 2. In one exemplary implementation, each ATM network interface may store connection data for connections that use the interface. Control module 210 may maintain a master connection table that keeps track of all of the connections maintained by all of the interfaces. Table 1C shown below is an example of a master connection table that may be maintained by control module 210.

TABLE 1A

Connection Data for ATM Interface #1

| VPI/VCI | Voice Server MAC Address | Internal VPI/VCI |
|---|---|---|
| 1/1 | ETH6 | 100/1 |
| 1/2 | ETH6 | 100/2 |

TABLE 1B

Connection Data for ATM Interface #3

| VPI/VCI | Voice Server MAC Address | Internal VPI/VC |
|---|---|---|
| 1/3 | ETH7 | 100/3 |
| 1/4 | ETH7 | 100/4 |

TABLE 1C

Master Connection Table

| ATM NI | Network VPI/VCI | Voice Server MAC Address | Internal VPI/VCI |
|---|---|---|---|
| 1 | 1/1 | ETH6 | 100/1 |
| 3 | 1/2 | ETH6 | 100/2 |
| 1 | 1/3 | ETH7 | 100/3 |
| 3 | 1/4 | ETH7 | 100/4 |

In Tables 1A and 1B, the left hand column includes network VPI/VCI values. These values will be used by each network processor to identify the connection to which ingress ATM cells are assigned. The center column in Tables 1A and 1B includes voice server MAC addresses for voice servers assigned to each connection. In the illustrated example, the MAC addresses range from ETH6-ETH9, corresponding to the voice servers illustrated in FIG. 2. The right hand column in Tables 1A and 1B includes the VPI/VCI value that is used internally by voice servers 208 to identify connections. The data in Table 1C is the superset of the data in Tables 1A and 1B, with the addition of the left-most column, which identifies the ATM network interface with which each connection is associated.

Using data such as that illustrated above in Table 1A or 1B, each ATM network interface 206 may perform VPI/VCI translations. In an alternate arrangement, each ATM network interface may simply encapsulate ATM cells and Ethernet frames addressed to the appropriate voice servers, and voice servers 208 may perform VPI/VCI translations before the cells are forwarded to the DSPs that process the data for each channel.

In order to properly switch Ethernet frames that contain ATM cells or other payloads, Ethernet switching fabric 202 may also include a table that maps destination MAC addresses to output ports. Table 2 shown below illustrates exemplary switching data that may be maintained by Ethernet switching fabric 202.

TABLE 2

Switch Fabric Destination MAC Address to Port Mappings

| Destination MAC Address | Ethernet Switch Output Port |
|---|---|
| Eth 0 | 1 |
| Eth 1 | 2 |
| Eth 2 | 3 |
| Eth 3 | 4 |
| Eth 4 | 5 |
| Eth 6 | 7 |
| Eth 7 | 8 |
| Eth 8 | 9 |
| Eth 9 | 10 |

In Table 2, the left hand column includes destination MAC addresses for each device connected to Ethernet switching fabric 202. The right hand column includes the Ethernet switching fabric port to which each device is connected. Thus, if Ethernet switching fabric 202 receives a frame having a destination MAC address of ETH0, the frame will be sent to port 1, which corresponds to IP network interface 204.

In order to forward egress ATM cells to the proper ATM network interface, voice servers 208 preferably include mappings between internal VPI/VCI combinations and the corresponding MAC address of the ATM network interface. Tables 3A and 3B shown below illustrate exemplary connection data including VPI/VCI to egress ATM network interface data that may be maintained by two voice servers 208, respectively number 1 and 2 in the Tables. Table 3C is a master voice server connection table that includes all of the connections maintained by all voice servers

TABLE 3A

Connection Table for Voice Server #1

| Internal VPI/VCI | Egress ATM Network Interface MAC Address | Network VPI/VCI |
|---|---|---|
| 100/1 | Eth2 | 1/1 |
| 100/2 | Eth2 | 1/2 |

TABLE 3B

Connection Table for Voice Server #2

| Internal VPI/VCI | Egress ATM Network Interface MAC Address | Network VPI/VCI |
|---|---|---|
| 100/3 | Eth4 | 1/3 |
| 100/4 | Eth4 | 1/4 |

TABLE 3C

Master Voice Server Connection Table Maintained by Control Module

| Voice Server | Internal VPI/VCI | Egress ATM Network Interface MAC Address | Network VPI/VCI |
|---|---|---|---|
| 1 | 100/1 | Eth2 | 1/1 |
| 2 | 100/2 | Eth2 | 1/2 |
| 1 | 100/3 | Eth4 | 1/3 |
| 2 | 100/4 | Eth4 | 1/4 |

In Tables 3A and B, the left hand column includes internal VPI/VCI values. The center column includes the MAC address of the corresponding ATM network interface. It should be noted from Tables 3A and 3B that only two of the four network interfaces have Ethernet addresses listed in Tables 3A and 3B. These Ethernet addresses may correspond to the working interfaces of an ATM automatic protection system group. The ATM interfaces corresponding to Ethernet addresses ETH3 and ETH5 may function as protection interfaces. Ethernet switching fabric 202 may automatically replicate ATM cells to the protection interfaces using any of the mechanisms described in a commonly-assigned, co-pending patent application entitled, "Methods, Systems, and Computer Program Products for Implementing Automatic Protection Switching for Media Packets Transmitted over an Ethernet Switching Fabric," filed on even date herewith, the disclosure of which is incorporated herein by reference in its entirety. It should also be noted that any of the voice server, Ethernet switching fabric, and/or ATM network interface data structures referenced in the co-pending application may be utilized to transport ATM cells over an Ethernet switching fabric according to the subject matter described herein.

Table 3C includes a superset of the data in Tables 3A and 3B. That is, Table 3C includes connection data for all of the connections being processed by voice servers 208. In the right most left most column, Table 3C includes an identifier of the voice server to which each connection belongs.

Figure 3A:
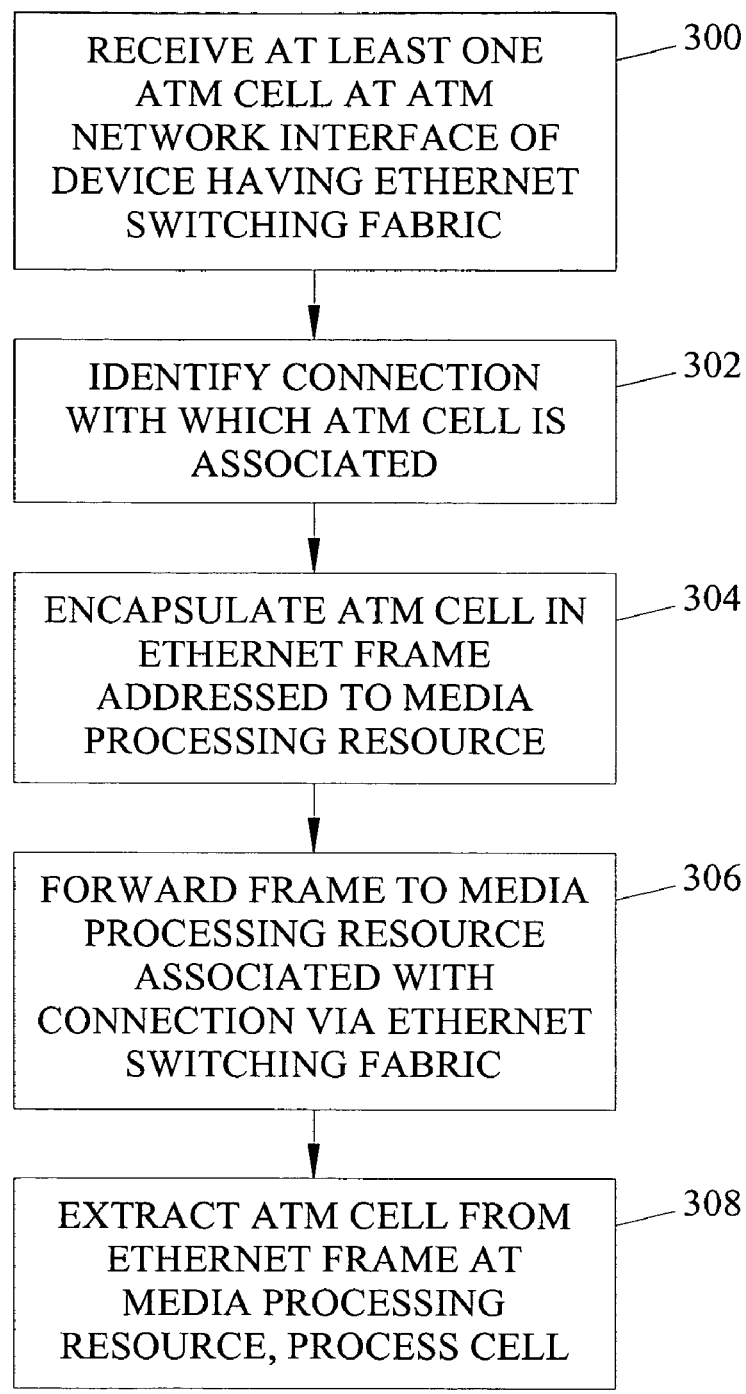
FIG. 3A is a flow chart illustrating exemplary steps for transporting ingress ATM cells in a device including an Ethernet switching fabric according to an embodiment of the subject matter described herein.

FIG. 3A is a flow chart illustrating exemplary steps for transporting ingress ATM cells over an Ethernet switching fabric according to an embodiment of the subject matter described herein. The terms "ingress" and "egress", as used herein, are intended to refer to the direction of a cell through the media gateway; rather than to the direction of a cell in a call. For example, an ingress cell may be a cell that is traveling from a network interface to a voice server for processing, and an egress cell may be a cell that is traveling from a voice server to a network interface for outbound transmission.

Referring to FIG. 3, in step 300, at least one ATM cell is received at an ATM network interface of a device having an Ethernet switching fabric. In step 302, a connection associated the ATM cell is identified. This step may be performed by network processors 212 illustrated in FIG. 2. For example, a network processor 212 may perform a lookup in its associated connection table 214 using the VPI/VCI combination extracted from an ingress ATM cell. If a VPI/VCI match is located in the table, network processor 212 may utilize the data in the corresponding entry to forward the ATM cell to its destination within the media gateway. Accordingly, once an ingress ATM cell is assigned to a connection, control proceeds to step 304 where the ATM cell is encapsulated in Ethernet frame addressed to a media processing resource associated with the connection. Exemplary frame formats for encapsulating ATM cells will be described in detail below.

In step 306, the frame is forwarded to the media processing resource associated with a connection via the Ethernet switching fabric. In step 308, the ATM cell is extracted from the Ethernet frame at the media processing resource and the cell is processed. For example, the ATM cell may be converted into another format, such as IP or TDM, and sent to the IP or TDM network interface associated with the destination.

Figure 3B:
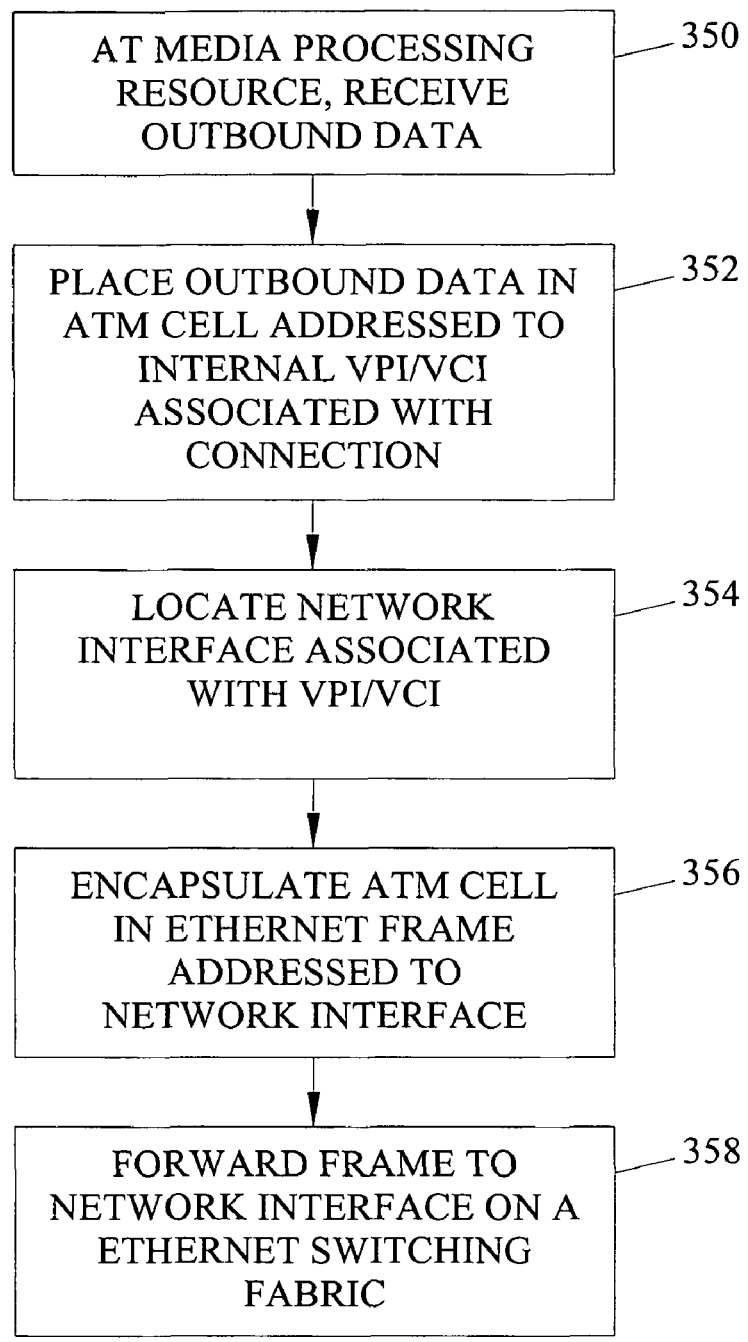
FIG. 3B is a flow chart illustrating exemplary steps for transporting egress ATM cells in a device including an Ethernet switching fabric according to an embodiment of the subject matter described herein.

FIG. 3B is a flow chart illustrating exemplary steps for processing egress ATM cells in a device having an Ethernet switching fabric according to an embodiment of the subject matter described herein. Referring to FIG. 3B, in step 350, outbound data is received at a media processing resource. For example, the outbound data may be voice data extracted by the media processing resource from an ingress ATM cell for which the media processing resource performed a transcoding operation. In step 352, the outbound data is placed in an ATM cell addressed to an internal VPI/VCI associated with the connection. In step 354, the network interface MAC Address associated with the destination is located. This step may include performing a lookup in a connection table, such as those illustrated in FIGS. 3A and 3B above, using the VPI/VCI extracted from the ATM cell. In step 356, the ATM cell is encapsulated in an Ethernet frame addressed to the network interface located in step 354. In step 358, the frame is forwarded to a network interface over the Ethernet switching fabric.

Figure 4:
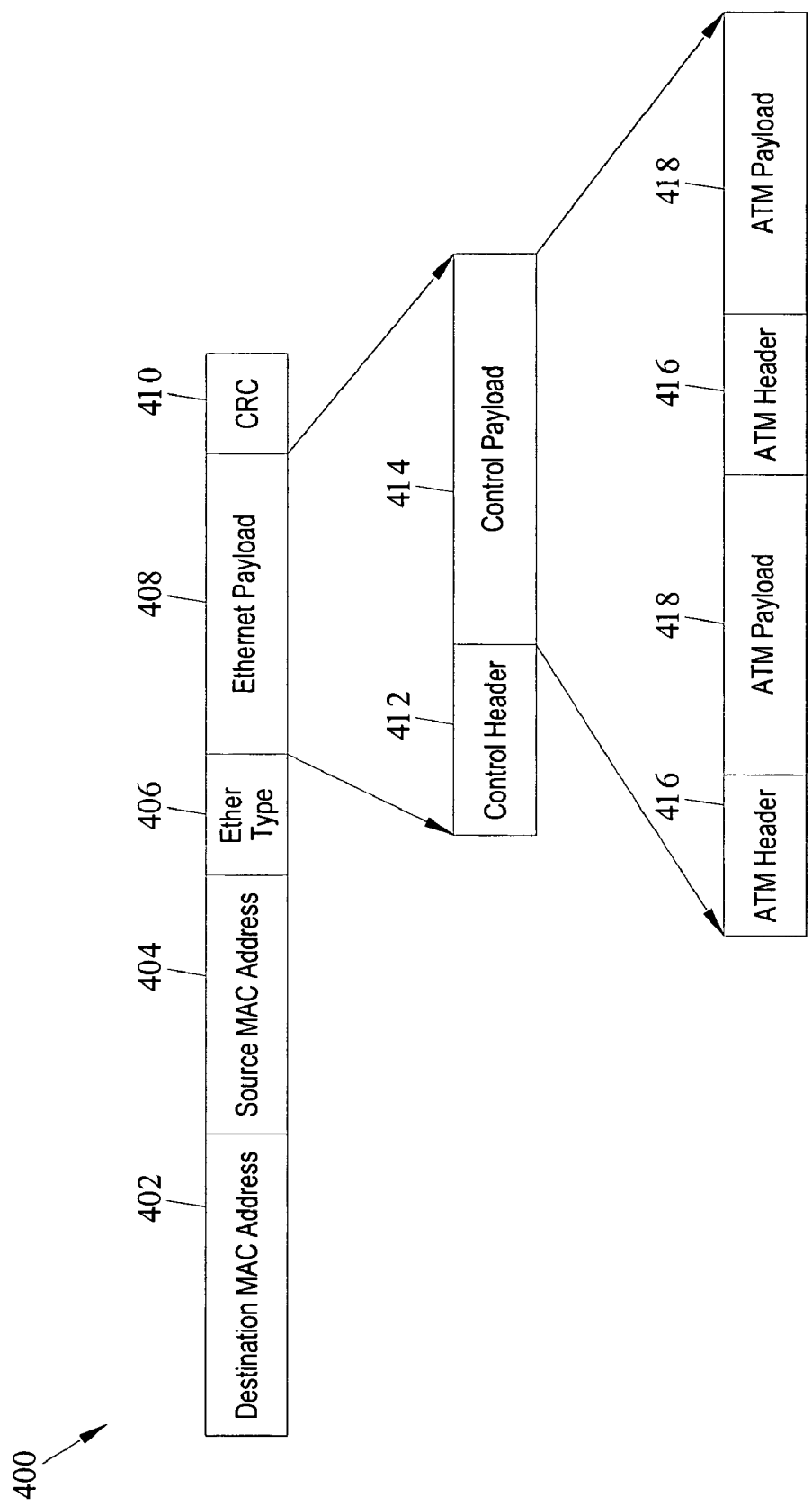
FIG. 4 is a block diagram illustrating an exemplary Ethernet frame format for transporting ATM cells in a device having an Ethernet switching fabric according to an embodiment of the subject matter described herein.

Data associated with each direction of a conversation between end users may be processed independently using the steps illustrated in FIGS. 3A and 3B. For example, ATM cells from user A to user B may be processed using the steps illustrated in FIGS. 3A and 3B, and ATM cells from user B to user A may be processed using the steps illustrated in FIGS. 3A and 3B. The processing of cells associated with different directions of the same conversation may occur simultaneously, depending on when the cells are received by the media gateway. FIG. 4 is a block diagram illustrating an exemplary frame format for transporting ATM cells in a device having an Ethernet switching fabric according to an embodiment of the subject matter described herein. Referring to FIG. 4, Ethernet frame 400 includes destination MAC address field 402, source MAC address field 404, Ether type field 406, payload field 408, and CRC field 410. Destination MAC address field 402 stores the MAC address corresponding to the destination device connected to Ethernet switching fabric 202. Source MAC address 404 stores the MAC address of the device that originates in Ethernet frame transmitted over Ethernet switching fabric 202. Ether type field 406 may store a value that indicates the type of payload stored in payload field 408. In one exemplary implementation, a special Ether type may be defined to identify an ATM payload. Additional Ether types may be defined to identify the ATM adaptation layer type, e.g., AAL1, AAL2, or AAL5, associated with the Ethernet payload. Thus, encapsulating an ATM cell in an Ethernet frame for transmission over Ethernet switching fabric 202 may include setting Ethernet type field 406 to indicate that payload field 408 stores ATM data or a particular type of ATM adaptation layer data.

Using Ether type field 406 to indicate that Ethernet payload field 408 stores ATM data or a particular type of ATM adaptation layer data decreases the processing required by voice servers 208. For example, if voice servers 208 can quickly identify the payload type based on values stored in Ether type field 406, the ATM payload can be forwarded to the appropriate DSP within each voice server for further processing.

In the example illustrated in FIG. 4, Ethernet payload field 408 stores a control header 412 and a control payload 414. Control payload 414 stores a plurality of ATM cells, each including an ATM header 416 and an ATM payload 418. Control header 412 includes fields that describe control payload 414. For example, control header 412 may indicate the number of ATM cells stored in control payload 414, the VPI/VCI associated with the cells and control payload 414, and the source or destination interface ID associated with the cells in control payload 414. Each ATM header 416 may store standard values according to the ATM protocol, such as VPI and VCI values. ATM payloads 418 may store any type of data, including voice, video, images, or other data types. CRC field 410 stores a code used to detect and correct errors in Ethernet frame 400.

Figure 5:
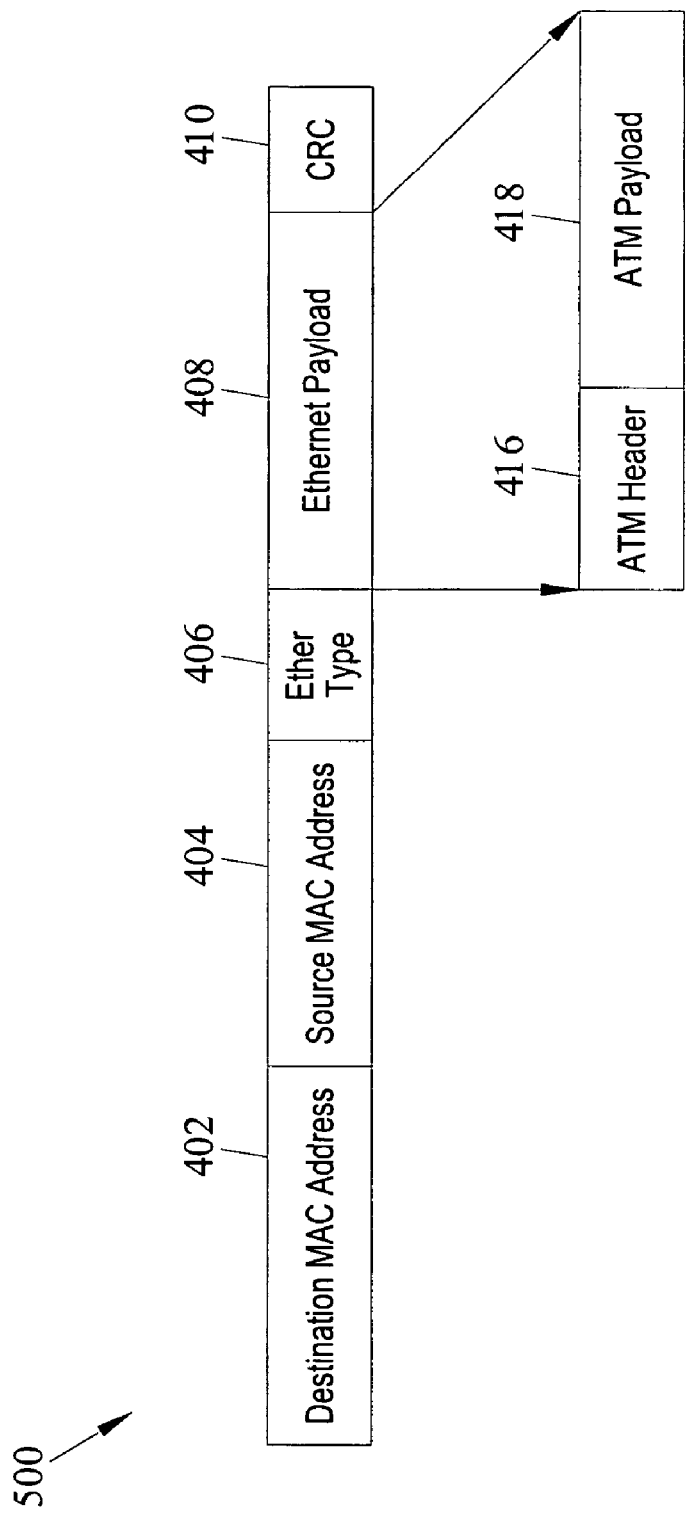
FIG. 5 is a block diagram illustrating an alternate Ethernet frame format for transporting ATM cells in a device having an Ethernet switching fabric according to an embodiment of the subject matter described herein.

In an alternate implementation, each Ethernet frame sent over Ethernet switching fabric 202 may encapsulate a single ATM cell and control header 412 may be omitted. FIG. 5 illustrates an Ethernet frame according to this example. Referring to FIG. 5, Ethernet frame 500 includes fields 402-410 as described above with regard to FIG. 4. However, rather than including a control header 412 and a control payload 414, payload field 408 includes a single ATM cell including an ATM header 416 and an ATM payload 418. The format illustrated in FIG. 5 is less efficient in terms of bit overhead per unit of media stream information sent. However, the format illustrated in FIG. 5 requires less processing overhead at the ATM network interfaces and the voice servers to formulate the Ethernet frames.

Figure 6:
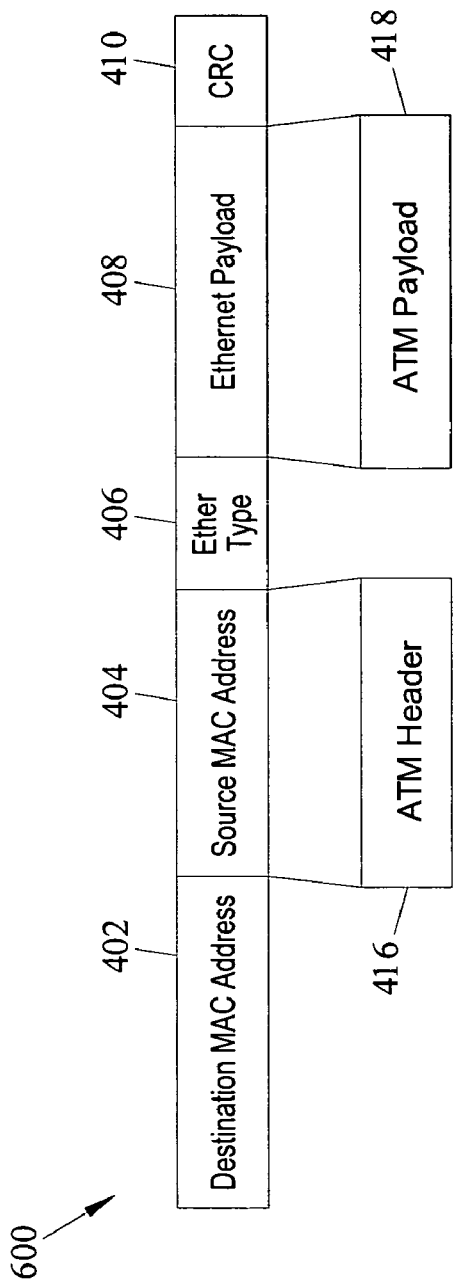
FIG. 6 is a block diagram illustrating an alternate Ethernet frame format for transporting ATM cells in a device having an Ethernet switching fabric according to an embodiment of the subject matter described herein.
Figure 7:
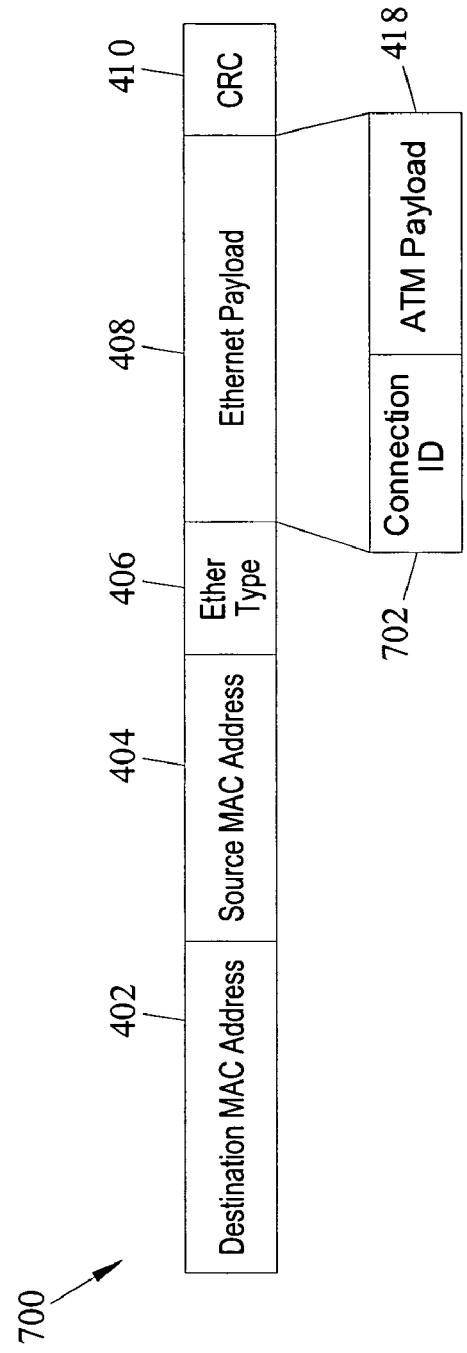
FIG. 7 is a block diagram illustrating an alternate Ethernet frame format for transporting ATM cells in a device having an Ethernet switching fabric according to an embodiment of the subject matter described herein.

FIGS. 6 and 7 illustrate alternate Ethernet frame formats for encapsulating ATM cells to be sent over an Ethernet switching fabric according to an embodiment of the subject matter described herein. Referring to FIG. 6, Ethernet frame 600 includes the same fields as Ethernet frames 400 and 500 described above. However, payload field 408 stores only an ATM payload 418, without any ATM or control headers. ATM header 416 is stored or encoded in source MAC address field 404 of Ethernet frame 600. Ether type field 406 may identify the content of payload field 408 as ATM. Omitting ATM and control headers from the payload decreases the number of bits required for frame 600, thus making transmission and storage more efficient.

Referring to FIG. 7, Ethernet frame 700 includes the same fields as any of the frame formats described above. However, payload field 408 stores an ATM payload 418 without any ATM headers. Payload field 408 stores a connection identifier 702 that identifies the connection to which ATM payload 418 belongs. As described above with respect to FIG. 6, omitting the ATM header from the Ethernet payload decreases the number of bits required to send or store the Ethernet frame. Adding a connection identifier to the payload field allows Ethernet-encapsulated ATM cells to be more readily associated with a connection within a media gateway. The connection identifier may be an internal identifier that the media gateway assigns to a connection. The identifier may have a smaller numbering space than a VPI/VCI, since the media gateway may not need the entire VPI/VCI numbering space for internal connections. Using a connection identifier with a smaller numbering space that the VPI/VCI further reduces the size of the Ethernet frame and may also reduce the time to identify a connection. For example, the connection identifier may be used as an index to the connection tables maintained by the voice services and/or the network interfaces.

The frame formats illustrated in FIGS. 4-7 may be used by network processors 212 of ATM network interfaces 206 and by voice servers 208 when formulating Ethernet frames to carry ATM cells over Ethernet switching fabric 202. For example, network processors 212 of ATM network interfaces 206 may build frames including the format of any one or more of FIGS. 4-7 and use those frames to transmit ingress ATM cells to voice servers 208. Similarly, voice servers 208 may use either format to transmit frames carrying ATM cells to ATM network interfaces 206.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method of transporting asynchronous transfer mode (ATM) cells in a media gateway having an Ethernet switching fabric, the method comprising:

(a) receiving at least one ingress ATM cell at an ATM network interface of a media gateway, wherein the media gateway includes having an internal Ethernet switching fabric;
(b) identifying, in the media gateway, a connection with which the at least one ATM cell is associated;
(c) encapsulating, in the media gateway, the at least one ATM cell in an Ethernet frame addressed to an Ethernet address corresponding to a media processing resource in the media gateway associated with the connection, wherein the media processing resource comprises a voice server in the media gateway; and
(d) forwarding the Ethernet frame to the media processing resource via the internal Ethernet switching fabric over the connection which is identified by an internal virtual path identifier/virtual channel identifier (VPI/VCI) value associated with the Ethernet address, wherein the media gateway is configured to perform media format translations for media streams communicated between communication terminals and is controlled by a media gateway controller, and wherein the internal VPI/VCI value is translated from a network VPI/VCI value associated with the at least one ingress ATM cell.

2. The method of claim 1 wherein identifying a connection with which the at least one ATM cell is associated includes performing a lookup in a connection table at the ATM network interface using at least one of a virtual path identifier (VPI) and a virtual channel identifier (VCI) located in the at least one ATM cell.

3. The method of claim 2 wherein encapsulating the ATM cell in an Ethernet frame addressed to a media processing resource associated with the connection includes locating an Ethernet address corresponding to the VPI and VCI in the connection table and inserting the address in a destination media access control (MAC) address field of the Ethernet frame.

4. The method of claim 2 wherein encapsulating the at least one ATM cell in an Ethernet frame includes, in response to failing to locate an entry corresponding to the VPI and VCI in the connection table, dynamically allocating a media processing resource to the connection, and inserting a media access control (MAC) address of the dynamically allocated media processing resource in a destination MAC address field of the Ethernet frame.

5. The method of claim 1 wherein encapsulating the at least one ATM cell in an Ethernet frame includes setting an Ether type field in the Ethernet frame to identify a payload of the Ethernet frame as ATM.

6. The method of claim 1 wherein encapsulating the at least one ATM cell in an Ethernet frame includes setting an Ether type field in the Ethernet frame to identify an ATM adaptation layer type of a payload portion of the Ethernet frame.

7. The method of claim 1 wherein encapsulating the at least one ATM cell in an Ethernet frame includes adding a control header to the at least one ATM cell and encapsulating the control header and the at least one ATM cell in the Ethernet frame.

8. The method of claim 7 wherein the control header identifies a number of ATM cells encapsulated in the Ethernet frame.

9. The method of claim 7 wherein the control header identifies a network VPI/VCI associated with the at least one ATM cell.

10. The method of claim 7 wherein the control header identifies a source interface ID associated with the at least one ATM cell.

11. The method of claim 1 wherein encapsulating the at least one ATM cell in the Ethernet frame includes encapsulating a single ATM cell in the Ethernet frame.

12. The method of claim 1 wherein encapsulating at least one ATM cell in the Ethernet frame includes encapsulating a plurality of ATM cells in the Ethernet frame.

13. The method of claim 1 wherein encapsulating the at least one ATM cell in the Ethernet frame includes encapsulating a payload of the ATM cell in the Ethernet frame and storing an ATM header of the at least one ATM cell in a source MAC address field of the Ethernet frame.

14. The method of claim 1 wherein encapsulating the at least one ATM cell in the Ethernet frame comprises encapsulating an ATM payload of the at least one ATM cell and a connection identifier in a payload portion of the Ethernet frame and wherein the method further comprises, at the media processing resource, using the connection identifier to identify a connection with which the ATM payload is associated.

15. The method of claim 14 wherein the connection identifier has a smaller numbering space than a VPI/VCI numbering space.

16. The method of claim 1 wherein the network VPI/VCI value is translated to the internal VPI/VCI value at the ATM network interface.

17. The method of claim 1 wherein the network VPI/VCI value is translated to the internal VPI/VCI value at the media processing resource.

18. The method of claim 1 comprising, at the media processing resource:
(a) receiving egress data;
(b) encapsulating the egress data in an egress Ethernet frame addressed to an egress network interface; and
(c) forwarding the egress Ethernet frame to the egress network interface.

19. The method of claim 18 comprising, at the egress network interface, receiving the Ethernet frame including the egress data and encapsulating the egress data in an egress ATM cell and forwarding the egress ATM cell to an egress ATM network interface.

20. The method of claim 18 comprising, at the egress network interface, receiving the Ethernet frame including the egress data and encapsulating the egress data in an egress IP packet and forwarding the egress IP packet to an IP network interface.

21. The method of claim 18 comprising, at the egress network interface, extracting the processed media data from the Ethernet frame and forwarding the processed media data to a destination over a network.

22. The method of claim 1 comprising, at the media processing resource, processing the at least one ATM cell to form time division multiplex (TDM) data and forwarding the TDM data to a TDM interface associated with the device.

23. A media gateway having at least one ATM network interface and an Ethernet switching fabric, the media gateway comprising:
(a) at least one ATM interface for receiving at least one ATM cell;
(b) at least one media processing resource for processing data contained in the at least one ATM cell, wherein the at least one media processing resource comprises at least one voice server;
(c) an internal Ethernet switching fabric for transporting ATM cells between the at least one ATM network interface and the at least one media processing resource; and
(d) a processor associated with the at least one ATM network interface for identifying a connection with which the at least one ATM cell is associated, for encapsulating the at least one ATM cell in an Ethernet frame addressed to an Ethernet address corresponding to a media processing resource associated with the connection, and for forwarding the Ethernet frame to the media processing resource associated with the connection via the internal Ethernet switching fabric over the connection identified by an internal virtual path identifier/virtual channel identifier (VPI/VCI) value associated with the Ethernet address, wherein the internal VPI/VCI value is translated from a network VPI/VCI value associated with the at least one ATM cell, and wherein the at least one ATM network interface, the at least one media processing resource, the Ethernet switching fabric, and the processor are components of a media gateway that is configured to perform media format translations for media streams communicated between communication terminals and is controlled by a media gateway controller.

24. The media gateway of claim 23 wherein the processor is adapted to identify the connection by extracting at least one of a virtual channel identifier (VCI) and a virtual path identifier (VPI) from the at least one ATM cell and using the at least one of a VPI and a VCI to perform a lookup in a connection table.

25. The media gateway of claim 24 wherein the processor is adapted to extract a media access control (MAC) address corresponding to the media processing resource associated with the connection from the connection table and insert the MAC address in a destination MAC address field of the Ethernet frame.

26. The media gateway of claim 23 wherein the processor is adapted to set an Ether type field in the Ethernet frame to a value to identify a payload of the Ethernet frame as ATM.

27. The media gateway of claim 23 wherein the processor is adapted to set an Ethernet type field of the Ethernet frame to a value identifying an ATM adaptation layer associated with a payload of the Ethernet frame.

28. The media gateway of claim 23 wherein the processor is adapted to formulate a control header and to encapsulate the at least one ATM cell and the control header in the Ethernet frame.

29. The media gateway of claim 28 wherein the control header identifies a number of ATM cells encapsulated in the Ethernet frame.

30. The media gateway of claim 28 wherein the control header identifies a VPI/VCI associated with the ATM cells encapsulated in the Ethernet frame.

31. The media gateway of claim 30 wherein the control header identifies a source interface ID associated with the ATM cells encapsulated in the Ethernet frame.

32. The media gateway of claim 23 wherein the processor is adapted to encapsulate a single ATM cell in the Ethernet frame.

33. The media gateway of claim 23 wherein the processor is adapted to encapsulate a plurality of ATM cells in the Ethernet frame.

34. The media gateway of claim 23 wherein the processor is adapted to encapsulate a payload of an ATM cell in the Ethernet frame and to store an ATM header of the ATM cell in a source MAC address field of the Ethernet frame.

35. The media gateway of claim 23 wherein the processor is adapted to encapsulate an ATM payload of an ATM cell and a connection identifier in a payload of the Ethernet frame and wherein the media processing resource is adapted to use the connection identifier to identify a connection with which the ATM payload is associated.

36. The media gateway of claim 35 wherein the connection identifier has a smaller numbering space than a VPI/VCI numbering space.

37. The media gateway of claim 23 wherein the at least one ATM network interface is adapted to translate the network virtual path identifier/virtual channel identifier (VPI/VCI) value to the internal VPI/VCI value.

38. The media gateway of claim 23 wherein the media processing resource associated with the connection is adapted to translate the network virtual path identifier/virtual channel identifier (VPI/VCI) to the internal VPI/VCI identifying the connection.

39. The media gateway of claim 23 wherein the media processing resource is adapted to receive egress ATM data and to forward the egress data to an egress network interface via the Ethernet switching fabric.

40. The media gateway of claim 39 wherein the egress data comprises an ATM cell and wherein the egress network interface comprises the ATM network interface.

41. The media gateway of claim 39 comprising at least one IP network interface, and wherein the egress packet comprises an IP packet addressed to the IP network interface.

42. The media gateway of claim 39 wherein the processor is adapted to extract the egress data from an egress Ethernet frame and to forward the egress data to a destination over a network.

43. The media gateway of claim 23 comprising at least one time division multiplex (TDM) network interface for sending and receiving media stream information over TDM channels and wherein the media processing resource is adapted to process the ATM cell to form egress TDM data and to forward the egress TDM data to the at least one TDM interface.

44. A non-transitory computer readable medium embodying computer executable instructions that when executed by a computer perform steps comprising:
(a) receiving at least one ingress ATM cell at an ATM network interface of a media gateway, wherein the media gateway includes an internal Ethernet switching fabric;
(b) identifying, in the media gateway, a connection with which the at least one ATM cell is associated;
(c) encapsulating, in the media gateway, the at least one ATM cell in an Ethernet frame addressed to an Ethernet address corresponding to a media processing resource in the media gateway associated with the connection, wherein the media processing resource comprises a voice server in the media gateway; and
(d) forwarding the Ethernet frame to the media processing resource via the internal Ethernet switching fabric over the connection which is identified by an internal virtual path identifier/virtual channel identifier (VPI/VCI) value associated with the Ethernet address, wherein the media gateway is configured to perform media format translations for media streams communicated between communication terminals and is controlled by a media gateway controller, and wherein the internal VPI/VCI value is translated from a network VPI/VCI value associated with the at least one ingress ATM cell.

* * * * *